United States Patent Office 3,049,551
Patented Aug. 14, 1962

3,049,551
NOVOBIOCIN INTERMEDIATE AND PROCESS THEREFOR
Edward Walton, Scotch Plains, and Claude Spencer, Chatham, N.J., assignors to Merck & Co., Inc., Rahway, N.J., a corporation of New Jersey
No Drawing. Original application Dec. 26, 1957, Ser. No. 705,139. Divided and this application Mar. 24, 1960, Ser. No. 21,847
3 Claims. (Cl. 260—343.2)

This application is a continuation-in-part of our co-pending application Serial No. 579,130, filed April 19, 1956, now abandoned, and a division of Serial No. 705,-139, filed December 26, 1957.

This invention relates to antibiotic substances and methods of synthesizing the same. More particularly, it is concerned with the synthesis of novobiocin and dihydronovobiocin.

Novobiocin is a new antibiotic active in inhibiting growth of gram-positive microorganisms primarily, although it also exhibits some activity against gram-negative microorganisms. It inhibits growth of the following organisms, inter alia:

M. pyogenes var. albus
M. pyogenes var. aureus
Diplococcus pneumoniae
Corynebacterium diphtheriae type gravis
Corynebacterium diphtheriae type intermedius
Corynebacterium diphtheriae type mitis
Corynebacterium xerose
Corynebacterium renale
Neisseria meningitidis
Sarcina lutea (VD)
M. pyogenes var. aureus resistant to aueromycin
M. pyogenes var. aureus resistant to streptomycin-streptothricin
M. pyogenes var. aureus resistant to penicillin Novobiocin salts also have antibiotic activity. For example, the sodium salt of novobiocin, when tested by the agar streak dilution assy, was found to inhibit the growth of various strains of M. pyogenes var. aureus, M. pyogenes var. albus, Neisseria meningitidis (No. 274), and Sarcina lutea (VD) at concentrations below 0.5 mcg. per ml. Other microorganisms are also affected by novobiocin or its salts in varying degrees.

It is now discovered, according to the present invention, that novobiocin and related substances can be prepared by reacting 1-chloro-2-O-acyl-3-O-carbamylnoviose (XII R) with a 3-acylamido-4,7-dihydroxy-8-methylcoumarin (V R) in the presence of silver oxide, and then hydrolyzing the resulting reaction product. This reaction can be shown as follows:

wherein R represents an acyl radical.

Thus, when 3 - (3 - [γ,γ-dimethylallyl]-4-acyloxybenz-amido)-4,7-dihydroxy-8-methylcoumarin (IX R) is reacted with 1-chloro-2-O-acyl-3-O-carbamylnoviose in the presence of silver oxide and the condensation product is hydrolyzed, novobiocin is produced. Similarly, when 3-(3 - [3 - methylbutyl] - 4 - acyloxybenzamido) - 4,7 - di-hydroxy-8-methylcoumarin (IX AR) is reacted with 1-chloro-2-O-acyl-3-O-carbamylnoviose and the intermediate acylated derivative is hydrolyzed, dihydronovobiocin is obtained. The foregoing described reactions can be shown structurally as follows:

In carrying out this process for the preparation of novobiocin and the compound related thereto pursuant to the present invention, the 3-acylamido-4,7-dihydroxy-8-methylcoumarin is dissolved in a suitable solvent, such as dioxane, and silver oxide is added thereto. To the resulting suspension is then added the 1-chloro-2-O-acyl-3-O-carbamylnoviose and the reaction mixture is stirred for sufficient time to complete the formation of the condensation product. Usually, it is found that stirring at room temperature for 5–10 hours is sufficient to complete the reaction.

In general, it is found desirable to carry out the reaction in the absence of light and under substantially anhydrous conditions in order to obtain optimum yields of the desired reaction product. Also, it is found that the reaction proceeds more rapidly if a small amount of iodine is added to the reaction mixture, although the addition of iodine is not essential to the condensation reaction.

After completion of the condensation reaction, the acyl substituent of the noviose moiety is readily removed by hydrolysis with alkali. Thus, after filtering the reaction mixture to remove insoluble by-products and following reduction of the excess iodine with sodium bisulfite, the filtrate is concentrated to a small volume at reduced pressure and treated with sodium hydroxide to a pH of about 7 which hydrolyzes off the acyl substituent of the noviose moiety. The novobiocin or novobiocinlike compound is conveniently recovered from the neutralized solution by lyophilization. The product so obtained can be further purified by recrystallization from suitable solvents or solvent mixtures.

In accordance with a further embodiment of the present invention, it is now found that the 1-chloro-2-O-acyl-3-O-carbamylnoviose (XII R) used in the condensation reactions described above can be prepared by acylating 3-O-carbamylnoviose (X) to form the diacyl derivative, 1,2-di-O-acyl-3-O-carbamylnoviose (XI R), and then reacting this diacylated compound with hydrogen chloride under anhydrous conditions to produce 1-chloro-2-O-acyl-3-O-carbamylnoviose (XII R). These reactions can be shown structurally as follows:

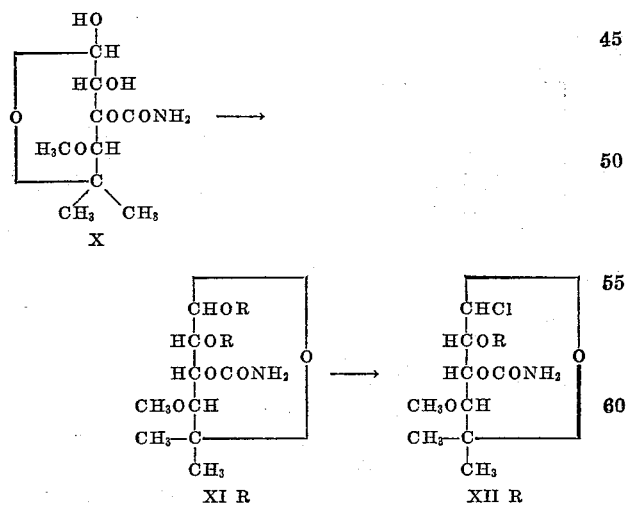

wherein R represents an acyl radical.

The 3-O-carbamylnoviose (X) used as the starting material in the above process can be prepared by processes which are more fully described in the copending application of Clifford Shunk, Serial No. 579,142, filed April 19, 1956.

In carrying out the first step in the foregoing process, it is preferred to use the acylated derivatives in which the acyl groups are derived from lower aliphatic acids having not more than eight carbon atoms, although other acyl groups can also be used for this purpose. This step is most conveniently effected using a lower aliphatic acid anhydride as the acylating agent. Thus, the diacetylated derivative is readily prepared by reacting the 3-O-carbamylnoviose with an excess of acetic anhydride in the presence of sodium acetate at 100° C. for about one hour. After completion of the reaction, the resulting mixture is diluted with ice and water and neutralized with sodium bicarbonate. The acetylated derivative is recovered by extraction with a suitable solvent, such as chloroform, and evaporation of the chloroform extract. The second step of this process is carried out by reacting the diacyloxy compound XI R with anhydrous hydrogen chloride in a suitable inert solvent medium such as ethyl ether, the reaction being preferably effected by intimately contacting the reactants at a temperature of about 0° C. for sufficient time to complete the conversion to the chloride (XII R).

Alternatively, 3-O-carbamylnoviose can be prepared starting with methyl 2,3-isopropylidene-L-rhamnofuranoside by procedures described in detail in the co-pending application of one of us, Serial No. 705,110, filed December 26, 1957, now U.S. Patent 2,938,900, and the copending application of Clifford Shunk and Karl Folkers, Serial No. 705,113, filed December 26, 1957, now U.S. Pat. 2,938,025. Thus, by procedures shown in Serial No. 705,110, filed December 26, 1957, now U.S. Patent 2,938,900, methyl 2,3-isopropylidene-L-rhamnofuranoside is converted to methyl α-noviopyranoside by the following reactions:

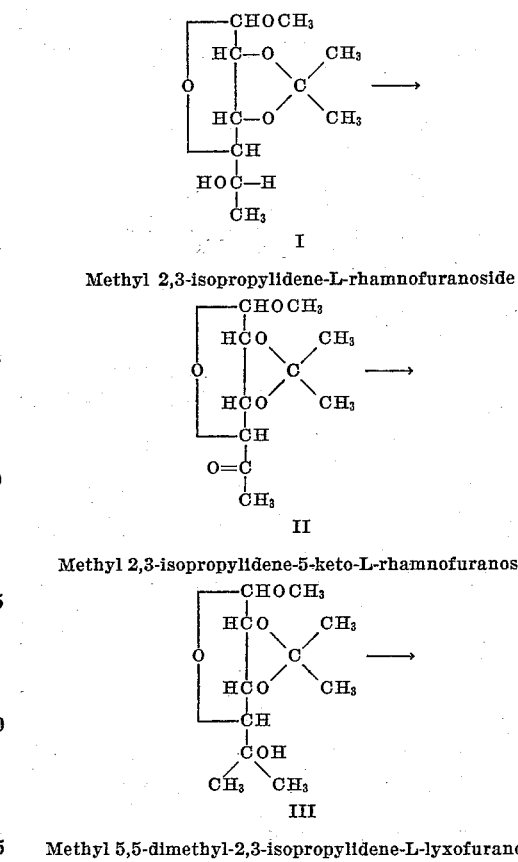

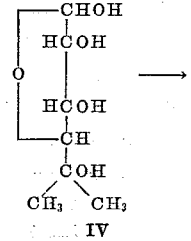

5
5,5-dimethyl-L-lyxose
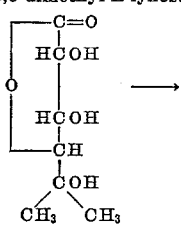
V 5,5-dimethyl-L-lyxono-γ-lactone
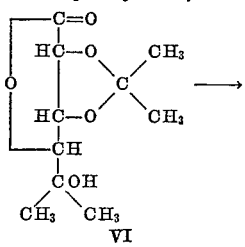
VI 5,5-dimethyl-2,3-isopropylidene-L-lyxono-γ-lactone
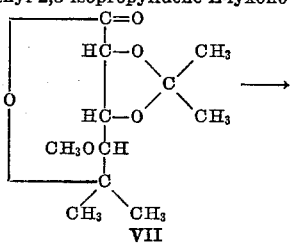
VII 2,3-isopropylidenenoviono-δ-lactone
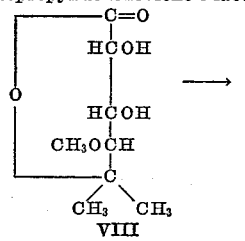
VIII Noviono-δ-lactone
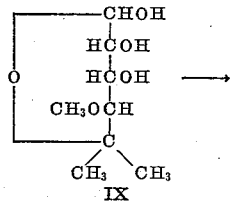
IX Noviopyranoside
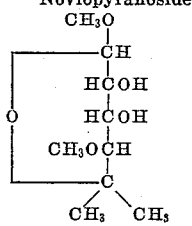
X Methyl α-noviopyranoside
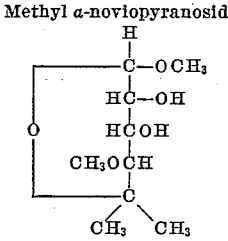
Xa Methyl β-noviopyranoside In the foregoing depicted reactions the starting material is first reacted with an oxidizing agent to produce methyl 2,3 - isopropylidene - 5 - keto - L - rhamnofuranoside, which upon reaction with a methyl magnesium halide, is converted to methyl 5,5-dimethyl-2,3-isopropylidene-L-lyxofuranoside. This latter compound is then hydrolyzed by reaction with a non-oxidizing inorganic acid to obtain 5,5-dimethyl-L-lyxose which is then oxidized to produce 5,5-dimethyl-L-lyxono-γ-lactone. Conversion of 5,5-dimethyl-L-lyxono-γ-lactone to the corresponding 2,3-isopropylidene derivative and methylation of the sodium salt of this intermediate results in the production of 2,3-isopropylidenenoviono-δ-lactone. Upon hydrolyzing 2,3-isopropylidenenoviono-δ-lactone with a non-oxidizing inorganic acid noviono-δ-lactone is obtained. When noviono-δ-lactone is reduced by reaction with suitable reducing agents noviopyranoside is obtained, which upon methylation is converted to a mixture of methyl α-noviopyranoside and methyl β-noviopyranoside. The mixture of methyl α-noviopyranoside and methyl β-noviopyranoside can then be separated by fractional crystallization from suitable solvent mediums to produce methyl α-noviopyranoside and methyl β-noviopyranoside.

In accordance with the processes described in Serial No. 705,113, filed December 26, 1957, now U.S. Patent 2,938,025, the methyl α-noviopyranoside can be converted to 3-O-carbamylnoviose by the following processes:

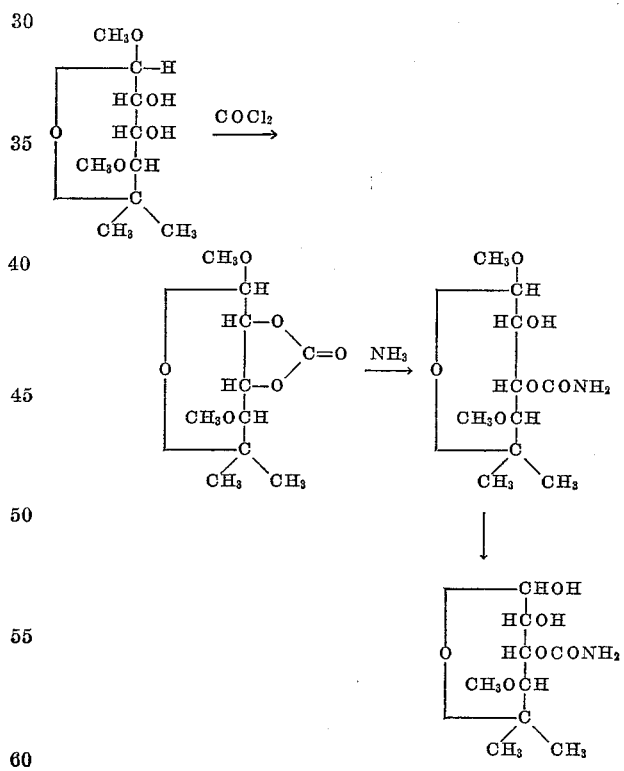

In the foregoing reaction scheme the methyl α-noviopyranoside is reacted with phosgene in the presence of pyridine to obtain methyl α-noviopyranoside 2,3-carbonate. Reaction of this compound with ammonia in methanol solution affords methyl 3-O-carbamyl-α-noviopyranoside. Hydrolysis of the latter product by reaction with hydrochloric acid in aqueous solution until the rotation of the solution remains constant affords 3-O-carbamylnoviose.

Pursuant to another embodiment of the present invention, it is now found that the 3-acylamido-4,7-dihydroxy-8-methylcoumarin (V R) used as a starting material in the processes described above can be prepared by acylating 3-amino-4,7-dihydroxy-8-methylcoumarin. This reaction can be shown structurally as follows:

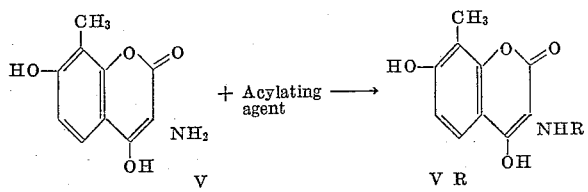

wherein R represents an acyl substituent.

Thus, the 3-amino-4,7-dihydroxy-8-methylcoumarin can be acylated by reaction with an acid anhydride in the presence of pyridine or sodium acetate to produce the corresponding acylated derivative. Alternatively, the 3-amino-4,7-dihydroxy-8-methylcoumarin can be acylated by reaction with an acid chloride. For example, when 3-amino-4,7-dihydroxy-8-methylcoumarin is reacted with 3-(γ,γ-dimethylallyl)-4-acyloxybenzoyl chloride (VIII R), or 3-(3-methylbutyl)-4-acyloxybenzoyl chloride (VIII AR) in the presence of sodium acetate or pyridine 3-(3-[γ,γ - dimethylallyl] - 4 - acyloxybenzamido) - 4,7 - dihydroxy-8-methylcoumarin (IX R), and 3-(3-[3-methylbutyl] - 4 - acyloxybenzamido) - 4,7 - dihydroxy - 8 - methylcoumarin (IX AR), respectively are produced. These reactions can be shown structurally as follows:

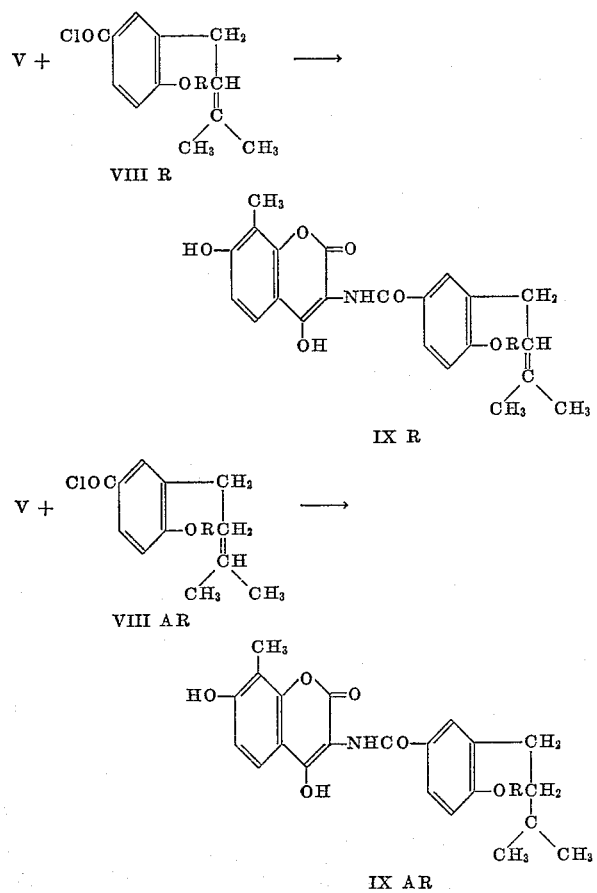

wherein R represents an acyl group.

These reactions are conveniently carried out by suspending the coumarin compound in water adding sodium acetate thereto, and then adding the acyl chloride in small amounts while agitating the reaction mixture. After completion of the reaction, the desired product is obtained by acidifying the aqueous solution to a pH of about 2. At this pH the product is insoluble and can be recovered by filtration. If desired, the product can be further purified by crystallization from suitable solvents.

In accordance with another embodiment of this invention, it is now discovered that 3-amino-4,7-dihydroxy-8-methylcoumarin hydrochloride (V) can be prepared in several steps starting with 2-methylresorcinol. This method comprises reacting 2-methylresorcinol with an ester of cyanoacetic acid in the presence of zinc chloride and hydrogen chloride under anhydrous conditions to produce 7-hydroxy-4-imino-8-methyl-2-oxochroman (II), heating this imino compound with 50% sulfuric acid to obtain 4,7-dihydroxy-8-methylcoumarin (III), treating this compound with nitrous acid to produce 2,4-dioxo-7-hydroxy-8-methyl-3-oximinochroman (IV), and reducing this product with hydrogen in the presence of a noble metal catalyst, such as palladium on charcoal, to produce the desired 3-amino-4,7-dihydroxy-8-methylcoumarin hydrochloride (V). These reactions can be shown structurally as follows:

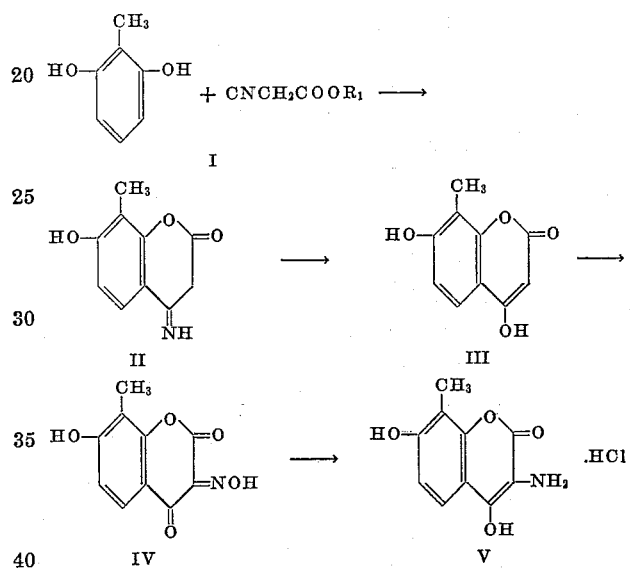

wherein $R_1$ represents a hydrocarbon group.

In carrying out the first step of the above-described reactions any ester of cyanoacetic acid can be utilized, although it is preferred to employ a lower alkyl ester in this reaction, i.e., esters of lower alkanols having from one to eight carbon atoms. Thus, this reaction is conveniently effected by using ethyl cyanoacetate. Using this ester the condensation is readily carried out by reacting the 2-methylresorcinol with ethyl cyanoacetate in a suitable solvent such as ether, cooling this solution, adding zinc chloride, and finally passing dry hydrogen chloride into the cold mixture. After completion of the reaction, the temperature is permitted to rise to room temperature and the reaction mixture is allowed to stand for about a day to insure completion of the reaction. The reaction product 7-hydroxy-4-imino-8-methyl-2-oxochroman hydrochloride (II) separates from the mixture and is readily recovered by filtration. The recovered product may be further purified, if desired, by crystallization from suitable solvents or suitable solvent mixtures.

The second step of the above process is readily effected by heating a solution of the imino compound (II) in a large volume of 50% sulfuric acid at about 100° C. The product is recovered by cooling the reaction mixture and filtering off the precipitated 4,7-dihydroxy-8-methylcoumarin (III).

The step of converting the 4,7-dihydroxy-8-methylcoumarin to 2,4 - dioxo - 7 - hydroxy - 8 - methyl - 3 - oximinochroman (IV) is readily carried out by suspending the starting material in water, and adding a solution of sodium nitrite. To insure completion of the reaction, the mixture is shaken frequently for 3 hours during which time the coumarin compound gradually dissolves. After filtering this reaction mixture, it is cooled in an ice bath thereby causing periciptation of the oximino compound in crystalline form and it can be readily recovered by filtration.

The final step in the process of preparing 3-amino-4,7-dihydroxy-8-methylcoumarin hydrochloride is conveniently carried out by dissolving the 2,4-dioxo-7-hydroxy-8-methyl-3-oximino coumarin in a suitable solvent such as ethanol, adding a noble metal catalyst, and at least one equivalent of hydrochloric acid, and hydrogenating the resulting reaction mixture. The hydrogenation is continued until the required amount of hydrogen has been absorbed. In carrying out this redution, it is preferred to use a palladium catalyst suspended on charcoal, although other forms of noble metals or suspended noble metals on inert carriers can be used for this purpose. When the reaction is carried out in this manner the product is readily recovered by filtering off the catalyst and evaporating the resulting solution to dryness.

Pursuant to another embodiment of this invention, it is now discovered that the 3-($\gamma$,$\gamma$-dimethylallyl)-4-acyloxybenzoyl chloride (VIII R) used as a starting material in the above-described process can be prepared by acylating 3-($\gamma$,$\gamma$-dimethylallyl)-4-hydroxybenzoic acid (VI), and treating the sodium salt of the acylated product with oxalyl chloride. These reactions can be shown as follows:

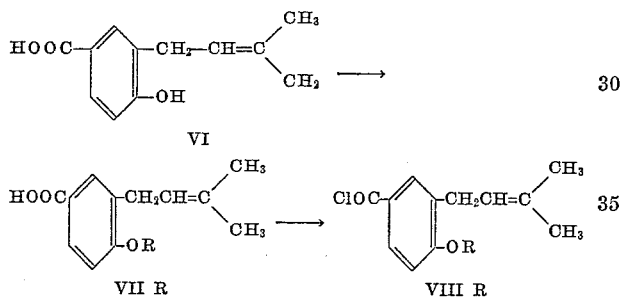

wherein R represents an acyl radical.

In carrying out the acylation of 3-($\gamma$,$\gamma$-dimethylallyl)-4-hydroxybenzoic acid any of the several methods for effecting the acylation of phenolic compounds can be used. It is found that the acyl derivatives of lower aliphatic carboxylic acids having from 2–8 carbon atoms are particularly advantageous in the described process and are therefore preferred intermediate products. Such acylated derivatives are readily prepared by reaction with the acid anhydride in the presence of pyridine. For example, the acetoxy derivative is conveniently obtained by mixing the hydroxybenzoic acid with acetic anhydride in the presence of dry pyridine and allowing the resulting reaction mixture to stand overnight. The acetylated product can be recovered by conventional means such as treating the reaction mixture with water, acidifying the resulting solution and recovering the precipitated product by filtration.

The second step in the process of preparing 3-($\gamma$,$\gamma$-dimethylallyl)-4-acetoxybenzoyl chloride is readily accomplished by treating the sodium salt of the acylated product with oxalyl chloride at lower temperatures in a suitable solvent medium such as benzene. After completion of the reaction the precipitated sodium chloride is removed and the filtrate concentrated at reduced pressure to obtain the acid chloride.

In accordance with another embodiment of this invention, the 3-(3-[3-methylbutyl]-4-acyloxybenzoyl chloride (VIII AR) is obtained in a manner similar to that described above for the preparation of 3-($\gamma$,$\gamma$-dimethylallyl-lyl-4-acyloxybenzoyl chloride using 3-(3-methylbutyl)-4-hydroxybenzoic acid (VI A) as the starting material. Thus, the starting material is first acylated to form the corresponding acylated derivative and this acylated derivative is reacted with thionyl chloride to produce 3-(3-methylbutyl)-4-acyloxybenzoyl chloride (VIII AR). These reactions can be shown structurally as follows:

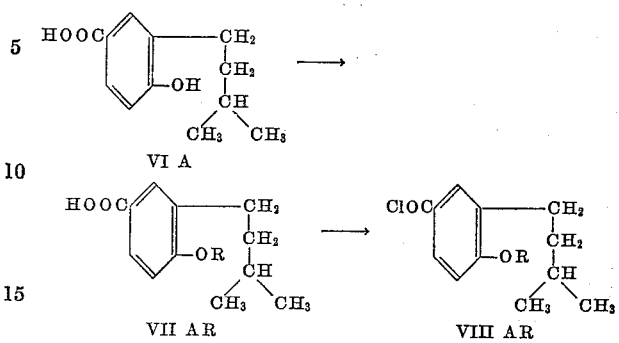

wherein R represents an acyl group.

In the reactions described above, 3-amino-4,7-dihydroxy-8-methylcoumarin (V) and its N-acylated derivatives such as compounds IX, IX A, and IX AR have been described and written structurally as coumarin compounds. However, these compounds may exist and react as chromone compounds in which the positions of the 4-hydroxy group and the keto group are reversed. Thus, these compounds may be shown structurally as follows:

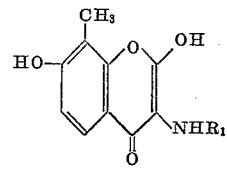

wherein $R_1$ represents hydrogen or an acyl group.

Novobiocin, dihydronovobiocin, and their salts are useful antimicrobial agents. For example, they can be utilized to remove susceptible microorganisms from pharmaceutical equipment and the like, or to separate certain microorganisms from solutions containing mixtures of several microorganisms. Also, novobiocin or its salts are useful in the treatment of animals infected with microorganisms which are susceptible to the action of our new antibiotic. For example, novobiocin has been found to be very useful in the treatment of mastitis in cows. Mastitis ointments containing 20–100 mgs. of sodium novobiocin per 7.5 g. are suitable for this purpose.

Novobiocin, dihydronovobiocin, and their salts are useful in the treatment of staphyloccci infections resistant to other antimicrobial agents and can be used in the treatment of such infections in humans. For example, for this purpose the sodium salt of novobiocin can be administered orally in the form of capsules containing, for example, about 100 to 500 mgs. of the antibiotic at a daily dosage level of one to two grams. Thus, a suitable dosage form is prepared by encapsulating 250 mgs. of the monosodium salt in a No. 1 soft gelatin capsule. Alternatively, novobiocin and its salts can be administered in the form of tablets. Such tablets can be prepared by mixing powdered sodium novobiocin with a small amount of a 5% solution of cellulose acetate hydrogen phthalate in methanol-acetone (50–50), granulating the material through a No. 8 sieve, drying the resulting granules, putting the dried granules through a No. 12 sieve, and compressing the resulting granules with the addition of a small amount of magnesium stearate to form tablets containing 250 mg. of sodium novobiocin.

Novobiocin is also effective in the treatment and control of plant diseases. Thus, it can be used in the control of bean blight caused by *Xanthomonas phaseoli*. For this purpose the plants are sprayed with an aqueous solution containing about 100 parts per million of the sodium salt of novobiocin. Such sprays may contain various wetting or spreading agents and/or other active agents, and can be prepared in accordance with methods well known in the art.

Dihydronovobiocin and its salts are at least as active and, in most instances, more active than novobiocin against test microorganisms, particularly against important disease-producing types. For example, dihydronovobiocin exhibits more than two-fold improvement in activity against two of them, *C. pseudotuberculosis* 545 and *C. pseudodiphthericum* 259. Dihydronovobiocin, when compared with novobiocin is significantly more active in vivo against infections with Proteus sp., *Micrococcus pyogenes* var. *aureus* Smith, *Streptococcus pyogenes* and *Diplococcus pneumoniae*, erythromycin resistant.

The following examples are presented as illustrative embodiments of the present invention.

EXAMPLE 1

*Preparation of 3-Amino-4,7-Dihydroxy-8-Methylcoumarin Hydrochloride (V) Starting With 2-Methylresorcinol (I)*

A. PREPARATION OF 7-HYDROXY-4-IMINO-8-METHYL-2-OXOCHROMAN (II)

Thirty-seven grams of 2-methylresorcinol (I) (R. C. Shah and M. C. Laiwalla, J. Chem. Soc., 1938, 1828) and 34 g. of ethyl cyanoacetate are dissolved in 150 ml. of ether. The solution is cooled in an ice-bath and 20 g. of fused zinc chloride is added in portions with stirring. Dry hydrogen chloride gas is then passed into the ice-cold mixture for two hours. The ice-bath is removed and the mixture is allowed to warm up to room temperature and kept for two days. The solid product, 7-hydroxy-4-imino-8-methyl-2-oxochroman, is separated by filtration, washed with a little cold water and dried in a vacuum desiccator over phosphorus pentoxide.

B. PREPARATION OF 4,7-DIHYDROXY-8-METHYLCOUMARIN (III)

A solution of 18 g. of 7-hydroxy-4-imino-8-methyl-2-oxochroman (II) in 400 ml. of 50% sulfuric acid is heated on the steam bath for 20 hours. The mixture is cooled in an ice bath and the solid 4,7-dihydroxy-8-methylcoumarin is collected on a filter, washed with ice-cold water and dried in a vacuum desiccator over phosphorus pentoxide.

C. PREPARATION OF 2,4-DIOXO-7-HYDROXY-8-METHYL-3-OXIMINOCHROMAN (IV)

To a suspension of 0.54 g. of 4,7-dihydroxy-8-methylcoumarin (III) in 100 ml. of water is added a solution of 0.20 g. of sodium nitrite in 5 ml. of water. The mixture is kept at room temperature and shaken frequently for 3 hours, during which time the coumarin slowly dissolves. The clear, greenish-brown solution is filtered to remove a trace of solid material and is then cooled in an ice-bath and acidified with acetic acid. When crystallization is complete the solid 2,4 - dioxo - 7-hydroxy-8-methyl-3-oximinochroman is collected on a filter, washed with a little ice-cold water and dried in a vacuum desiccator over phosphorus pentoxide.

D. PREPARATION OF 3-AMINO-4,7-DIHYDROXY-8-METHYLCOUMARIN HYDROCHLORIDE (V)

A solution of 100 mg. of 2,4-dioxo-7-hydroxy-8-methyl-3-oximinochroman (IV) in 20 ml. of absolute ethanol is added to a suspension of 0.5 g. of prereduced palladium on charcoal (10%) in 20 ml. of absolute alcohol and 0.6 ml. of 2.5 N hydrochloric acid. The mixture is shaken with hydrogen at 25° C. until the calculated amount is adsorbed. The catalyst is removed by filtration and the filtrate is evaporated to dryness under reduced pressure. The amine hydrochloride is recrystallized from alcohol.

EXAMPLE 2

*Preparation of 3-(γ,γ-Dimethylallyl)-4-Hydroxybenzoic Acid Starting With Ethyl-p-Hydroxybenzoate*

A. PREPARATION OF ETHYL 3-(γ,γ-DIMETHYLALLYL)-4-HYDROXYBENZOATE

A mixture of 7 g. of sodium metal cut into small pieces, 300 ml. of dry toluene, and 50 g. of ethyl p-hydroxybenzoate is heated under reflux and stirred for a few hours. The mixture is cooled in an ice bath and stirred while 50 g. of γ,γ-dimethylallyl bromide is added dropwise during a period of two hours. The reaction mixture is stirred for fifteen hours at room temperature and then warmed to 50° C. for one-half hour. After filtration to remove sodium bromide, the toluene solution is concentrated under reduced pressure to 100 ml. and extracted three times with 100 ml. portions of 2.5 N sodium hydroxide. The alkaline extracts are combined, cooled to 0° C. and carefully acidified to pH 6 with 2 N sulfuric acid. The heavy oil which separated is extracted with ether, dried over magnesium sulfate and concentrated in vacuo; weight 42 g. This oil is dissolved in cyclohexane and extracted with a saturated solution of sodium carbonate to remove some unreacted ethyl p-hydroxybenzoate. The cyclohexane layer is dried over magnesium sulfate and concentrated in vacuo. The residue is dissolved in a boiling mixture of equal parts of cyclohexane and petroleum ether (B.P. 30–60°). After cooling at room temperature for a few hours and 3° overnight, the colorless prisms are collected on a filter; M.P. 62–66°. Recrystallization from a mixture of cyclohexane and petroleum ether (B.P. 30–60° C.) gives 18.9 g. of colorless prisms; M.P. 66–69° C.

B. PREPARATION OF 3-(γ,γ-DIMETHYLALLYL)-4-HYDROXYBENZOIC ACID

A solution of 7 g. of ethyl 3-(γ,γ-dimethylallyl)-4-hydroxybenzoate in 30 ml. of 4-N sodium hydroxide is heated on the steam cone for four hours. After cooling in an ice bath, the resulting solution of the sodium salt of 3-(γ,γ-dimethylallyl)-4 - hydroxybenzoic acid is acidified with dilute hydrochloric acid and extracted with ether. The combined ether extracts are washed with water, dried over magnesium sulfate, filtered, and concentrated in vacuo. The residue is dissolved in hot benzene and crystallized by slowly adding cyclohexane; M.P. 80–84°. Recrystallization from a mixture of benzene and cyclohexane gives colorless prisms; M.P. 87–89°. Several recrystallizations from benzene gives prisms melting at 94–95° C. The 3-(γ,γ-dimethylallyl)-4-hydroxybenzoic acid can be purified by dissolving it in a solution of sodium carbonate and extracting with ether. After acidifying the ice cold sodium carbonate solution with hydrochloric acid, the product is collected on a filter and washed with cold water. Recrystallization from a mixture of methanol and water gives colorless needles; M.P. 101–103° C.

EXAMPLE 3

*Preparation of 3 - (γ,γ-Dimethylallyl)-4-Acetoxybenzoyl Chloride (VIII) From 3-(γ,γ-Dimethylallyl) - 4 - Acetoxybenzoic Acid (VII)*

A. PREPARATION OF 3-(γ,γ-DIMETHYLALLYL)-4-ACETOXYBENZOIC ACID (VII)

A solution of 20.6 g. (0.1 mole) of 3-(γ,γ-dimethylallyl)-4-hydroxybenzoic acid (VI) in 100 ml. of dry pyridine is treated with 12.8 g. (0.125 mole) of acetic anhydride and kept at room temperature overnight. The reaction mixture is diluted with 400 ml. of ice and water and acidified with concentrated hydrochloric acid. The precipitated product is removed by filtration. The crude product is recrystallized from petroleum ether (B.P. 85–

100°) to yield purified 3-(γ,γ-dimethylallyl)-4-acetoxybenzoic acid.

B. PREPARATION OF 3-(γ,γ-DIMETHYLALLYL)-4-ACETOXYBENZOYL CHLORIDE (VIII)

A suspension of 24.8 g. (0.1 mole of 3-(γ,γ-dimethylallyl)-4-acetoxybenzoic acid (VII) in 50 ml. of water is treated with 40 ml. of 2.5 N sodium hydroxide. The resultant solution is lyophilized to yield to residue of sodium 3 - (γ,γ-dimethylallyl)-4-acetoxybenzoate. The sodium salt is added portionwise with stirring at ice temperature to a solution of 127 g. (1 mole) of oxalyl chloride in 400 ml. of dry benzene. After the final addition, stirring is continued for about 2 hours. The precipitated sodium chloride is removed and the filtrate is concentrated at reduced pressure. The residue is redissolved in benzene and reconcentrated to remove last traces of oxalyl chloride from the 3-(γ,γ-dimethylallyl)-4-acetoxybenzoyl chloride.

EXAMPLE 4

Preparation of 3-O-Carbamylnoviose

To a solution of 20 g. of novobiocin in one liter of methyl alcohol is added 10 ml. of hydrochloric acid (sp. gr. 1.19). The resulting solution is refluxed for about 1¼ hours, after which it is diluted with an equal volume of water and cooled. The resulting precipitate is collected and the filtrate is concentrated to about 300 ml. under reduced pressure. After filtering the concentrated solution it is made alkaline with sodium bicarbonate and lyophilized.

The residual solids are extracted portionwise with about 300 ml. of actone and the combined actone extracts are concentrated to about 25 ml. Methyl 3-carbamyl-4-methylnovobioside crystallizes from the resulting solution, and is collected and washed with acetone. After recrystallization from hot acetone the product is found to melt at 190–192° C.

One and one-half grams of methyl 3-O-carbamylnoviopyranoside is heated on the steam bath in 150 ml. of 0.1 N hydrochloric acid about forty-five minutes until the rotation of the solution reaches a constant value. The observed rotation of the solution at the end of this time is +0.50° in a 1 cm. tube (D line of sodium used). The resulting solution is lyophilized to produce 3-O-carbamylnoviose as a glass $[\alpha]_D^{22} = +46°$ (c., 1 in methanol).

EXAMPLE 5

Preparation of 1-Chloro-2-O-Acetyl-3-O-Carbamylnoviose From 3-O-Carbamylnoviose

A. PREPARATION OF 1,2-DI-O-ACETYL-3-O-CARBAMYLNOVIOSE (XI)

A 2.35 g. (0.01 mole) portion of 3-O-carbamylnoviose is added to 15 ml. of acetic anhydride and 12 g. of sodium acetate and the mixture is warmed at 100° C. for about an hour. The cooled reaction mixture is diluted with 30 ml. of ice and water and neutralized with sodium bicarbonate. The product is extracted into chloroform which is washed with water and dried. Removal of the chloroform gives 1,2-di-O-acetyl-3-O-carbamylnoviose (XI).

B. PREPARATION OF 1-CHLORO-2-O-ACETYL-3-O-CARBAMYLNOVIOSE (XII)

A solution of 1.6 g. (0.005 mole) of 1,2-di-O-acetyl-3-O-carbamylnoviose (XI) in 40 ml. of anhydrous ether is saturated (at about 0° C.) with anhydrous hydrogen chloride. The reaction is kept at ice temperature for 24 hours. The ether and excess hydrogen chloride are removed at reduced pressure. The last traces are removed by dissolving the residue in benzene and removing it at reduced pressure to yield the product XII.

EXAMPLE 6

Preparation of Novobiocin

A. PREPARATION OF 3-(3-[γ,γ - DIMETHYLALLYL]-4-ACETOXYBENZAMIDO)-4,7-DIHYDROXY-8-METHYLCOUMARIN (IX)

A suspension of 12.2 g. (0.05 mole) of 3-amino-4,7-dihydroxy-8-methylcoumarin hydrochloride (V) in 100 ml. of water containing 16 g. of sodium acetate is treated portionwise with 13.4 g. (0.05 mole) of 3-(γ,γ-dimethylallyl)-4-acetoxybenzoyl chloride (VIII) while the mixture is shaken. The mixture is shaken for about one hour after the final addition of acid chloride. The mixture is acidified to about pH 2 with hydrochloric acid. The product (IX) is removed and purified by recrystallization.

B. PREPARATION OF NOVOBIOCIN (XIII)

A solution of 2.2 g. (0.005 mole) of 3-(3-[γ,γ-dimethylallyl] - 4 - acetoxybenzamido) - 4,7 - dihydroxy - 8-methyl coumarin (IX) in 50 ml. of purified anhydrous dioxane is stirred while about 4 g. of anhydrous calcium sulfate and 4.6 g. (0.02 mole) of silver oxide are added. The mixture is protected from light and stirred for one hour. A small amount of iodine is added followed by a solution of 2.9 g. (0.01 mole) of 1-chloro-2-O-acetyl-3-O-carbamylnoviose (XII) in 10 ml. of pure anhydrous dioxane. The reaction mixture is stirred for 5–10 hours. The mixture is filtered to remove insoluble by-products and following reduction of the excess iodine with sodium bisulfite, the filtrate is concentrated at reduced pressure. The residue is hydrolyzed with two equivalents of dilute sodium hydroxide solution at room temperature. The solution is lyophilized and the residue is leached with warm methanol which dissolves the monosodium salt of novobiocin. The sodium salt may be crystallized by adding benzene or the free acid may be precipitated by adding acetic acid followed by water.

EXAMPLE 7

Alternate Preparation of 3-(3-[γ,γ-Dimethylallyl]-4-Acetoxybenzamido)-4,7-Dihydroxy-8-Methylcoumarin (IX)

3-amino-4,7-dihydroxy - 8 - methylcoumarin hydrochloride (1.9 g.) is added to a solution of 4.2 g. of 3-(γ,γ-dimethylallyl)-4-acetoxybenzoyl chloride (VIII) in 25 ml. of anhydrous pyridine at 0°. The solution is allowed to stand at room temperature overnight. Chloroform (150 ml.) and water (150 ml.) are added, and the mixture is acidified with 25 ml. of hydrochloric acid. The crystalline product is filtered and dried in a vacuum desiccator. It is purified by recrystallization from dimethylformamide-water; M.P. 243–249° C.

EXAMPLE 8

Preparation of 3-(3-Methylbutyl)-4-hydroxybenzoic Acid

A solution of 3 g. of ethyl 3-(γ,γ-dimethylallyl)-4-hydroxybenzoate in 50 ml. of ethanol is hydrogenated over 0.5 g. of platinum oxide catalyst. The theoretical amount of hydrogen is taken up within one hour. After removal of the catalyst by filtration, the alcohol is distilled under reduced pressure. The ethyl 3-(3-methylbutyl)-4-hydroxybenzoate is dissolved in 20 ml. of 4 N sodium hydroxide and heated on the steam cone for four hours. After acidification with hydrochloric acid, the mixture is extracted with ether. The ether extract was dried over magnesium sulfate, filtered, and concentrated in vacuo. The residue is dissolved in hot benzene and cyclohexane is added. After cooling the 3-(3-methylbutyl)-4-hydroxybenzoic acid is collected on a filter. Recrystallization from a mixture of chloroform and cyclohexane gives colorless needles; M.P. 108–9° C.

*Analysis.*—Calcd. for $C_{12}H_{16}O_3$: C, 69.20; H, 7.75. Found: C, 68.98; H, 7.29.

EXAMPLE 9

*Preparation of Dihydronovobiocin Starting With 3-(3-Methylbutyl)-4-Hydroxybenzoic Acid*

A. PREPARATION OF 3-(3-METHYLBUTYL)-4-ACETOXYBENZOIC ACID (VII A)

A mixture of 10.4 g. (0.005 mole) of 3-(3-methylbutyl)-4-hydroxybenzoic acid (VI A) and 50 ml. of pyridine is treated with 10 ml. of acetic anhydride. The mixture is kept at room temperature overnight. The mixture is poured into 300 ml. of ice and water. The resultant mixture is acidified to about pH 2 with concentrated hydrochloric acid. The precipitated product is removed and purified by recrystallization from petroleum ether (B.P. 85–100°).

B. PREPARATION OF 3-(3-METHYLBUTYL)-4-ACETOXYBENZOYL CHLORIDE (VIII A)

A mixture of 13 g. (0.05 mole) of 3-(3-methylbutyl)-4-acetoxybenzoic acid (VII A) and 50 ml. of thionyl chloride is kept at room temperature overnight. The solution is concentrated at reduced pressure. The residue is dissolved in 50 ml. of dry benzene and reconcentrated at reduced pressure to yield a residue of the desired acid chloride.

C. PREPARATION OF 3-(3-[3-METHYLBUTYL]-4-ACETOXYBENZAMIDO)-4,7-DIHYDROXY-8-METHYLCOUMARIN (IX A)

A suspension of 12.2 g. (0.05 mole) of 3-amino-4,7-dihydroxy-8-methylcoumarin hydrochloride (V) in 100 ml. of water containing 16 g. of sodium acetate is treated portionwise with 14.3 g. (0.055 mole) of 3-(3-methylbutyl)-4-acetoxybenzoyl chloride (VIII A) while the mixture is being shaken. The mixture is shaken for about one hour after the final addition of acid chloride. The reaction mixture is acidified to about pH 2 with hydrochloric acid. The product is removed and purified by recrystallization from isopropyl alcohol.

D. PREPARATION OF DIHYDRONOVOBIOCIN (XIII A)

A solution of 2.2 g. (0.005 mole) of 3-(3-[3-methylbutyl]-4-acetoxybenzamido)-4,7-dihydroxy-8-methylcoumarin (IX A) in 50 ml. of purified anhydrous dioxane is stirred while about 4 g. of anhydrous calcium sulfate and 4.6 g. (0.02 mole) of silver oxide are added. A small amount of iodine is added followed by a solution of 2.9 g. (0.01 mole) of 1-chloro-2-O-acetyl-3-O-carbamylnoviose (XII) in 10 ml. of pure anhydrous dioxane. The reaction mixture is stirred for 5–10 hours. The desired reaction product is recovered from the reaction mixture in the manner described in Example 6B.

EXAMPLE 10

*Alternate Preparation of 3-(3-[3-Methylbutyl]-4-Acetoxybenzamido)-4,7-Dihydroxy-8-Methylcourmarin (IX A)*

3-(3-methylbutyl)-4-acetoxybenzoyl chloride (4.7 g.) is added in small portions to a suspension of 2.0 g. of 3-amino - 4,7 - dihydroxy - 8 - methylcoumarin hydrochloride (V) in 30 ml. of anhydrous pyridine cooled in an ice bath. The mixture is stirred at room temperature overnight. After filtration of a small amount of solid material, 100 ml. of chloroform and 100 ml. of water are added to the filtrate and the mixture is acidified with hydrochloric acid. The aqueous phase is extracted with chloroform and the combined chloroform extracts are cooled and the product is separated by filtration. After recrystallization from chloroform the product melts at 207–209° C.

Various changes and modifications may be made in carrying out the present invention without departing from the spirit and scope thereof. Insofar as these changes and modifications are within the purview of the annexed claims, they are to be considered as part of our invention.

What is claimed is:

1. A process which comprises reacting 2-methylresorcinol with a lower alkyl ester to cyanoacetic acid under essentially anhydrous conditions in the presence of zinc chloride and hydrogen chloride to produce 7-hydroxy-4-imino-8-methyl-2-oxochroman, heating this compound with 50% sulfuric acid to produce 4,7-dihydroxy-8-methylcoumarin, treating this compound with nitrous acid to produce 2,4 - dioxo - 7 - hydroxy - 8 - methyl - 3 - oximinochroman, and reducing this compound by reaction with hydrogen in the presence of a noble metal catalyst and hydrochloric acid to produce 3-amino-4,7-dihydroxy-8-methylcoumarin hydrochloride.

2. The process of claim 1 in which the noble metal catalyst is palladium on charcoal.

3. 2,4 - dioxo - 7 - hydroxy - 8 - methyl - 3 - oximinochroman.

References Cited in the file of this patent

UNITED STATES PATENTS 2,929,821     Hoeksema et al.          Mar. 22, 1960

OTHER REFERENCES

Iguchi: Chem. Abstr., vol. 46 (1952), pp. 11187–11188.
Hinman et al.: Jour. Amer. Chem. Soc., vol. 78 (March 5, 1956), pp. 1072–1074.

UNITED STATES PATENT OFFICE
CERTIFICATE OF CORRECTION

Patent No. 3,049,551                                August 14, 1962

Edward Walton et al.

It is hereby certified that error appears in the above numbered patent requiring correction and that the said Letters Patent should read as corrected below.

Column 16, line 26, for "to" read -- of --.

Signed and sealed this 15th day of January 1963.

SEAL)
Attest:

ERNEST W. SWIDER
Attesting Officer

DAVID L. LADD
Commissioner of Patents